Nov. 25, 1941.  H. R. GOTTFRIED  2,263,947
COMBINED SIPPING AND DRINKING VESSEL
Filed Nov. 21, 1939   2 Sheets-Sheet 1
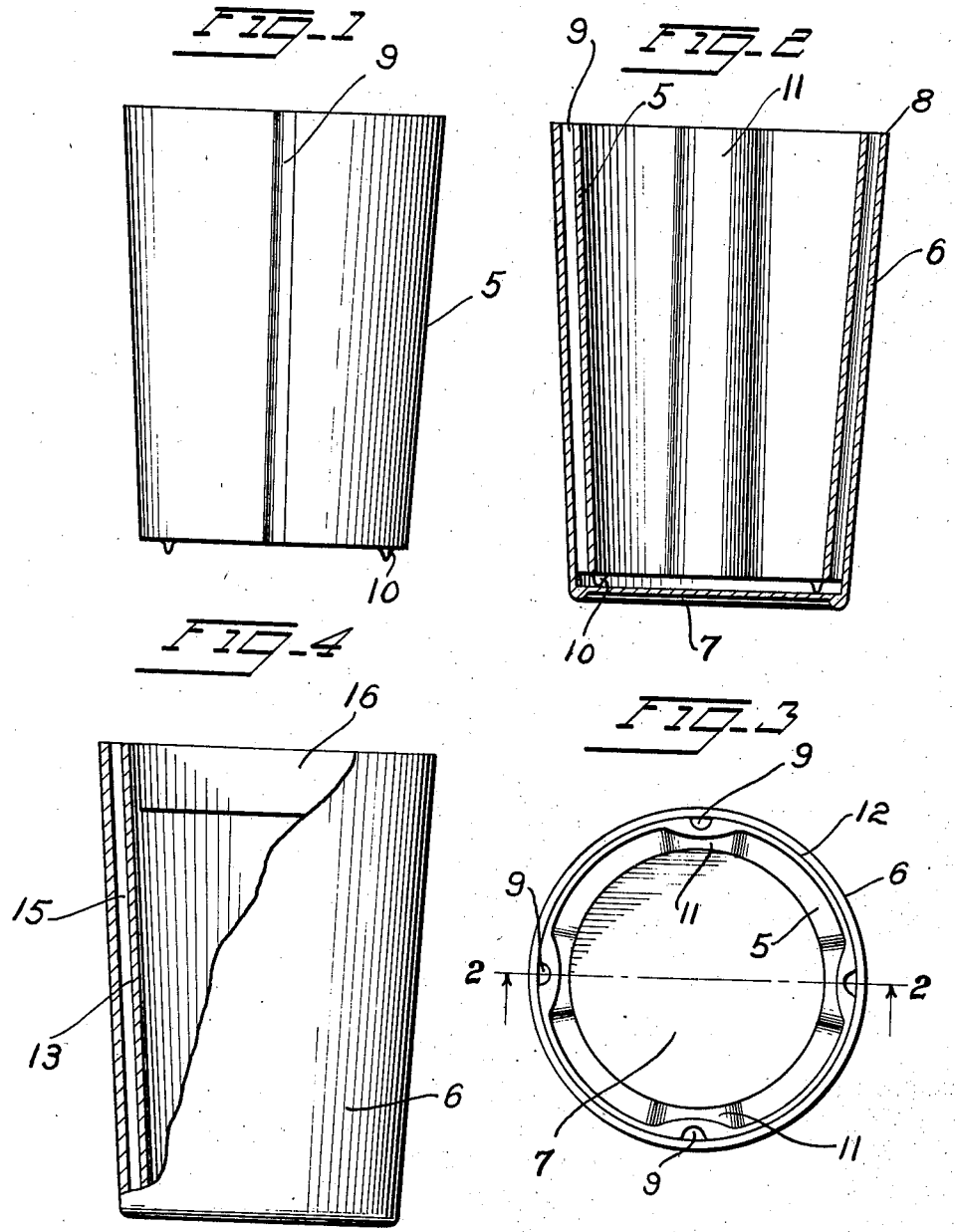
Inventor
Herbert R. Gottfried.

Nov. 25, 1941.  H. R. GOTTFRIED  2,263,947
COMBINED SIPPING AND DRINKING VESSEL
Filed Nov. 21, 1939   2 Sheets-Sheet 2
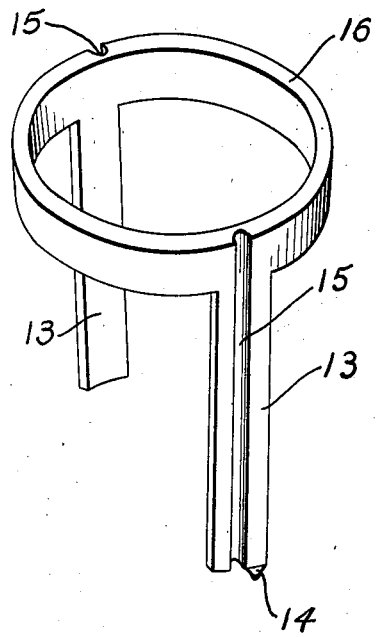
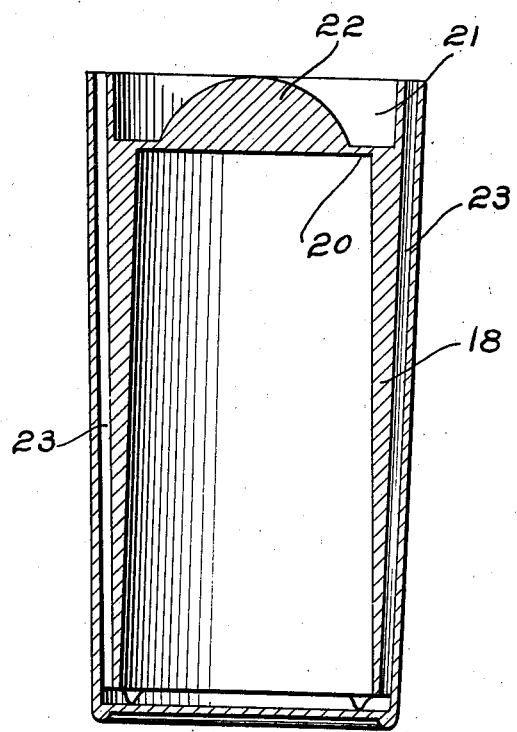
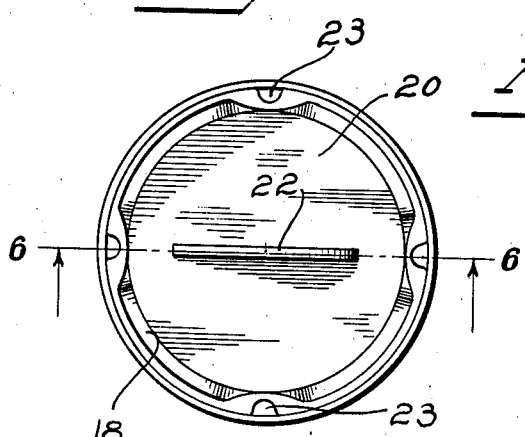
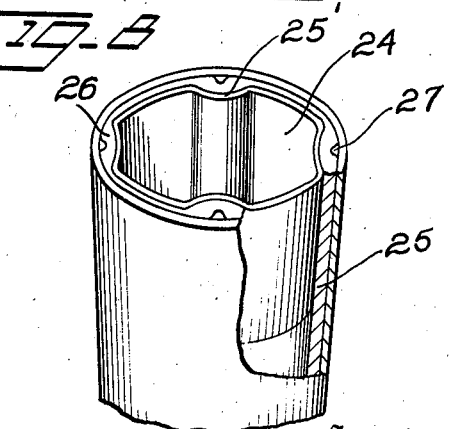
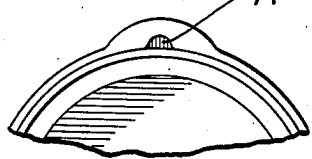
Inventor
Herbert R. Gottfried.
By Lacey & Lacey,
Attorneys Patented Nov. 25, 1941

2,263,947

UNITED STATES PATENT OFFICE 2,263,947

COMBINED SIPPING AND DRINKING VESSEL

Herbert R. Gottfried, Chicago, Ill.

Application November 21, 1939, Serial No. 305,514

10 Claims. (Cl. 65—13)

This invention relates to drinking vessels and more particularly to a combined sipping and drinking cup.

The object of the invention is to provide a drinking cup of simple and inexpensive construction especially designed for use by invalids and others and by means of which a person may sip liquid from a cup or other container without the use of a straw or separate liquid conducting tube and without danger of splashing, spilling or otherwise wasting the liquid.

A further object of the invention is to provide a cup or similar container which is sanitary in character and can be used with equally good results either for sipping or drinking liquid.

A further object is to provide a combined sipping and drinking cup including inner and outer nested members, one of which is provided with vertical grooves or channels spaced from the bottom of the cup and opening through the upper edge thereof and through which liquid in the inner member is conducted to the mouth of the user in relatively small quantities when suction is applied to the rim of the cup.

A further object is to provide an auxiliary cup detachably fitting within the main cup and adapted to receive ice cream or other frozen confection so as to permit the device to be used for dispensing both solids and liquids.

A still further object of the invention is generally to improve this class of devices so as to increase their utility, durability and efficiency as well as to reduce the cost of manufacture.

In the accompanying drawings forming a part of this specification and in which similar numerals of reference indicate corresponding parts in all the figures of the drawings:

Figure 1 is a side elevation of the inner liquid receiving member,

Figure 2 is a vertical sectional view taken on the line 2—2 of Figure 3 and showing the inner member nested within the outer member, Figure 3 is a top plan view of Figure 2, Figure 4 is a side elevation, partly in section, illustrating a modified form of the invention, Figure 5 is a perspective view of the device shown in Figure 4 detached, Figure 6 is a vertical sectional view illustrating a further modification, Figure 7 is a top plan view of Figure 6, Figure 8 is a perspective view, partly in section, showing a cup fitted within the inner member for the reception of ice cream or other frozen confection, and Figure 9 is a detail top plan view showing the liquid conducting grooves formed in the outer member.

The combined sipping and drinking cup forming the subject-matter of the present invention may be formed of any suitable material, such as glass, porcelain, paper or plastic composition molded or otherwise formed into the desired shape and comprises an open-ended inner member 5 and an outer member 6 having a closed bottom 7 and an open top 8. Formed in the exterior wall of the inner member 5 are vertical liquid conducting grooves or channels 9 extending the entire length thereof and opening through the top or rim of the outer member, as best shown in Figure 3 of the drawings. The inner member 5 is tapered downwardly and formed on the lower edge of said inner member are one or more depending spacing lugs 10 which bear against the bottom 7 of the outer member and serve to space the inner member therefrom so as to permit the liquid within the inner member to be drawn upwardly through the grooves or channels 9 to the mouth of the user when suction is applied to the rim of the cup. The inner wall of the inner member is provided opposite each channel or groove 9 with a lateral enlargement or rib 11 which serves to reinforce and strengthen the inner member at said grooves. The outer wall of the inner member at the top thereof has a snug fit with the inner wall of the outer member, as indicated at 12, so as to prevent the discharge of liquid other than through the liquid conducting channels 9. It will further be noted that the upper ends of the inner and outer members are disposed in the same horizontal plane so as to present a smooth unobstructed surface for contact with the lips of the user.

It will thus be seen that by placing the lip over the rim of the cup and exerting a slight suction at any one of the grooves 9, the liquid within the inner member will be drawn upwardly through the open bottom of the inner member and thence through the grooves 9 to the mouth without danger of splashing, spilling or otherwise wasting the liquid within the inner member. It will, of course, be understood that, when sipping liquid from the cup, the latter will be supported in a horizontal plane in the hand or on a suitable support. By tilting the cup, however, the device may be used for drinking liquid in the usual manner.

In Figures 4 and 5 of the drawings, there is illustrated a modified form of the invention, in which the side walls of the inner member are cut away to save material and to produce depending legs 13, the lower ends of which are provided with spacing lugs 14 for engagement with the bottom of the outer member in the manner previously described. In this form of the device, the liquid conducting grooves or channels 15 are formed in the outer walls of the legs 13 and open through the upper surface of the rim 16 of the inner member, the construction and operation of the device being otherwise similar to that shown in Figure 1 of the drawings. If desired, instead of forming the liquid conducting channels or grooves 9 in the inner member, said grooves may be formed in the outer member, as indicated at 17 in Figure 9 of the drawings, and it is to be understood that it is optional whether these liquid conducting grooves are formed in either the inner or outer members of the cup.

In Figure 6 of the drawings, there is illustrated a different form of the invention, in which the inner member 18 is provided with an integral top or cover 20 spaced downwardly from the upper edge of the inner member to form a recess or compartment 21 to accommodate a fin or finger-piece 22 preferably molded or otherwise formed integral with the top 20, as shown. This form of the device is designed for sipping liquid only but will permit tilting of the cup without waste of liquid as the top or cover 20 prevents escape of the liquid contents of the inner member when the cup is tilted in the act of sipping the liquid through the conducting grooves 23, as will be readily understood.

It is often desirable when eating ice cream or other frozen confection to have a beverage or other liquid handy to quench the thirst, and in Figure 8 of the drawings, I have illustrated a further modified form of the invention which can be used for dispensing both solids and liquids. In this form of the device, I provide a relatively shallow auxiliary cup 24 which is detachably fitted within the inner member 25 and is adapted to receive a quantity of ice cream or other frozen confection. The exterior walls of the auxiliary cup 24 are formed with seating grooves 25' adapted to register with the vertical reinforcements 26 on the inner wall of the inner member 25, the cup 24 being tapered and held in position within the inner member 25 by frictional engagement with the walls thereof. It will thus be seen that the auxiliary cup 24 may be filled with ice cream which can be dispensed therefrom with a spoon in the usual manner and in case the user becomes thirsty his or her thirst may be readily quenched by applying the lips to the rim of the cup opposite one of the liquid conducting grooves 27 and exerting a slight suction thereon, in which event the liquid within the inner member will be drawn upwardly through the adjacent groove 27 in the manner previously described.

Inasmuch as the inner and outer members are detachably nested one within the other, the parts may be readily separated to facilitate cleaning, thus rendering the device thoroughly sanitary in character.

It will, of course, be understood that the combined sipping and drinking cups may be made in different sizes and shapes and constructed of any suitable material without departing from the spirit of the invention.

Having thus described the invention, what is claimed as new is:

1. A combined sipping and drinking vessel comprising inner and outer nested members, one of which is removable and adapted to contain liquid, spaced reinforcing ribs formed on the inner wall of the inner member, there being liquid conducting grooves formed in the outer wall of said inner member at said reinforcing ribs and opening into the liquid and rim of the vessel respectively, and an auxiliary vessel detachably fitted within the inner member and provided with seats adapted to receive the reinforcing ribs.

2. A combined sipping and drinking vessel comprising an outer member, an inner member detachably fitting within the outer member and having its lower end spaced from the bottom of the outer member and its upper end closed and provided with a finger-piece, there being spaced liquid conducting grooves formed in the inner member and having their lower ends communicating with the outer member near the bottom thereof and their upper ends opening through the rim of the vessel.

3. A combined sipping and drinking vessel comprising an outer member, an inner member detachably fitted within the outer member and having its lower end provided with a lug engaging the bottom of the outer member to form a space between said inner and outer member, the upper end of the inner member being provided with a closure spaced inwardly from the upper edge thereof to form a chamber, and a finger-piece secured to the closure and entirely housed within the chamber, there being liquid conducting passages formed in the outer wall of the inner member and opening through the rim of said vessel.

4. A combined sipping and drinking vessel comprising inner and outer nested members, one of which is closed at the bottom and the other open and spaced from said closed bottom to form a relatively narrow passage, there being a liquid conductor formed in one of said members with its lower end communicating with said passage and its upper end opening through the rim of the vessel.

5. A combined sipping and drinking vessel comprising inner and outer freely separable nested members, one of which is closed at the bottom and adapted to contain liquid and the other entirely open at the bottom with its lower edge spaced from the closed bottom to form a relatively narrow passage, there being a liquid conductor formed in one of said members with its lower end communicating with said passage and its upper end opening through the rim of said vessel.

6. A combined sipping and drinking vessel comprising inner and outer freely separable nested members, the outer member being closed at the bottom and the inner member entirely open, lugs formed on the inner member and engaging the bottom of the outer member to provide a passage therebetween, there being a liquid conductor formed in one of said members with its lower end communicating with said passage and its upper end opening through the rim of said vessel.

7. A combined sipping and drinking vessel comprising inner and outer readily separable nested members, the outer member having a closed bottom and the inner member being open at the bottom and spaced from the closed bottom to form a relatively narrow passage, one of said members being provided with a vertical groove to form a liquid conductor having its lower end communicating with said passage and its upper end opening through the rim of the vessel.

8. A combined sipping and drinking vessel comprising inner and outer readily separable nested members, one of which is closed at the bottom and the other entirely open and spaced from and supported by the closed bottom to form an intermediate passage, the inner member being provided with interior vertical reinforcements and having grooves formed in its outer surface at said reinforcements and coacting with the outer member to form liquid conductors communicating with said passage and opening through the rim of said vessel.

9. A combined sipping and drinking vessel comprising inner and outer readily separable nested members, one of which is open at the top and closed at the bottom and adapted to contain liquid and the other being open at the top and bottom and provided with depending legs having liquid conducting grooves formed in the outer faces thereof and opening through the rim of said vessel.

10. A combined sipping and drinking vessel comprising inner and outer nested members, one of which is closed at the bottom and adapted to contain liquid and the other open at the bottom and spaced from said closed bottom to form an intermediate passage, there being grooves formed in one of the members and having their lower ends communicating with said passage and their upper ends opening through the rim of the vessel, and an auxiliary vessel detachably fitted within the inner member.

HERBERT R. GOTTFRIED.